(12) United States Patent
Choi

(10) Patent No.: US 10,093,840 B2
(45) Date of Patent: Oct. 9, 2018

(54) ADHESIVE COMPOSITION AND POLARIZING PLATE COMPRISING SAME

(71) Applicant: DONGWOO FINE-CHEM CO., LTD., Iksan-si, Jeollabuk-do (KR)

(72) Inventor: Han Young Choi, Iksan-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 1 day.

(21) Appl. No.: 15/317,198

(22) PCT Filed: Jun. 4, 2015

(86) PCT No.: PCT/KR2015/005608
§ 371 (c)(1),
(2) Date: Dec. 8, 2016

(87) PCT Pub. No.: WO2015/190748
PCT Pub. Date: Dec. 17, 2015

(65) Prior Publication Data
US 2017/0101563 A1    Apr. 13, 2017

(30) Foreign Application Priority Data

Jun. 12, 2014 (KR) .......................... 10-2014-0071739

(51) Int. Cl.
| | | |
|---|---|---|
| *C09J 133/16* | (2006.01) | |
| *C09J 133/06* | (2006.01) | |
| *C09J 11/06* | (2006.01) | |
| *G02F 1/1335* | (2006.01) | |
| *G02B 5/30* | (2006.01) | |
| *C09J 139/02* | (2006.01) | |
| *C09J 133/14* | (2006.01) | |
| *C09J 139/04* | (2006.01) | |
| *C09J 139/08* | (2006.01) | |

(52) U.S. Cl.
CPC ............. *C09J 133/16* (2013.01); *C09J 11/06* (2013.01); *C09J 133/066* (2013.01); *G02B 5/30* (2013.01); *G02F 1/133528* (2013.01); *B32B 2457/202* (2013.01); *C09J 133/14* (2013.01); *C09J 139/02* (2013.01); *C09J 139/04* (2013.01); *C09J 139/08* (2013.01); *G02F 2202/28* (2013.01); *Y10T 428/105* (2015.01); *Y10T 428/1036* (2015.01); *Y10T 428/1041* (2015.01); *Y10T 428/1055* (2015.01); *Y10T 428/1059* (2015.01); *Y10T 428/1077* (2015.01); *Y10T 428/1082* (2015.01)

(58) Field of Classification Search
CPC .... C09J 133/066; C09J 133/14; C09J 133/16; C09J 11/06; C09J 139/02; C09J 139/04; C09J 139/08; G02B 5/30; G02F 1/133528; G02F 2202/28; Y10T 428/1036; Y10T 428/1041; Y10T 428/105; Y10T 428/1055; Y10T 428/1059; Y10T 428/1077; Y10T 428/1082; B32B 2457/202
See application file for complete search history.

(56) References Cited

U.S. PATENT DOCUMENTS

2008/0311395 A1* 12/2008 Ukei ...................... C09J 133/06
                                                              428/354

FOREIGN PATENT DOCUMENTS

| JP | 06-322342 A | 11/1994 | | |
|---|---|---|---|---|
| JP | 2007-046018 A | 2/2007 | | |
| JP | 2007046018 A | * 2/2007 | ............ | C09J 133/04 |
| JP | 2008-285670 A | 11/2008 | | |
| KR | 10-2008-0047031 A | 5/2008 | | |
| KR | 10-2009-0016241 A | 2/2009 | | |
| KR | 20090016241 A | * 2/2009 | ............ | C09J 133/08 |
| KR | 10-2011-0137340 A | 12/2011 | | |

OTHER PUBLICATIONS

International Searching Authority, International Search Report for PCT/KR2015/005608 dated Sep. 16, 2015 [PCT/ISA/210].
International Searching Authority, Written Opinion for PCT/KR2015/005608 dated Sep. 16, 2015 [PCT/ISA/237].

* cited by examiner

*Primary Examiner* — Eli D. Strah
(74) *Attorney, Agent, or Firm* — Sughrue Mion, PLLC

(57) ABSTRACT

The present invention provides an adhesive composition comprising a tertiary amine group-containing acrylic copolymer and a sulfonate group-containing acrylic copolymer, a polarizing plate and a liquid crystal display device comprising the adhesive composition. The adhesive composition of the present invention comprises a tertiary amine group-containing acrylic copolymer and a sulfonate group-containing acrylic copolymer wherein an ionic functional group can be introduced by cross-linking reaction thereof, thereby exhibiting good antistatic properties and excellent durability.

12 Claims, No Drawings

ADHESIVE COMPOSITION AND POLARIZING PLATE COMPRISING SAME

CROSS REFERENCE TO RELATED APPLICATIONS

This application is a National Stage of International Application No. PCT/KR2015/005608 filed Jun. 4, 2015, claiming priority based on Korean Patent Application No. 10-2014-0071739 filed Jun. 12, 2014, the contents of all of which are incorporated herein by reference in their entirety.

TECHNICAL FIELD

The present invention relates to an adhesive composition and a polarizing plate comprising the same. Particularly, the present invention provides an adhesive composition having good antistatic properties and excellent durability, and a polarizing plate and a liquid crystal display device comprising the adhesive composition.

BACKGROUND ART

A liquid crystal display device (LCD) has a liquid crystal panel including a liquid crystal cell and polarizing plates laminated on both sides of the liquid crystal cell through adhesive layers.

The adhesive used to attach the polarizing plates to the liquid crystal cell should satisfy durability such as heat resistance, heat/moisture resistance, thermal shock resistance and cold resistance, reworkability for solving contact error or the presence of foreign substances, prevention of light leakage that is generated by the shrinkage stress of the polarizing plates, and antistatic property for preventing electrostatic generation while a release film is removed for adhesion of the polarizing plates.

Japanese Patent Application Publication No. 2008-285670 discloses an adhesive composition comprising an acrylic resin obtained by copolymerizing an alkyl (meth)acrylate and an ionic liquid containing a polymerizable unsaturated group, the adhesive composition having good adhesive and antistatic properties. However, such adhesive composition has weak cohesive strength and poor durability.

DISCLOSURE

Technical Problem

It is an object of the present invention to provide an adhesive composition having good antistatic properties and excellent durability.

It is another object of the present invention to provide a polarizing plate including an adhesive layer comprising the adhesive composition.

It is still another object of the present invention to provide a liquid crystal display device having the polarizing plate on at least one surface of a liquid crystal cell.

Technical Solution

In accordance with one aspect of the present invention, there is provided an adhesive composition comprising a tertiary amine group-containing acrylic copolymer and a sulfonate group-containing acrylic copolymer.

In one embodiment of present invention, the tertiary amine group-containing acrylic copolymer may be obtained by copolymerization of a (meth)acrylate monomer and a monomer simultaneously containing an unsaturated double bond and a tertiary amine group within the molecule.

In one embodiment of present invention, the sulfonate group-containing acrylic copolymer may be obtained by copolymerization of a (meth)acrylate monomer and a monomer simultaneously containing an unsaturated double bond and a sulfonate group within the molecule.

In one embodiment of present invention, the adhesive composition may give an ionic functional group by cross-linking reaction of the tertiary amine group-containing acrylic copolymer and the sulfonate group-containing acrylic copolymer while curing is conducted after the formation of an adhesive layer.

In accordance with another aspect of the present invention, there is provided a polarizing plate including an adhesive layer comprising the adhesive composition.

In accordance with still another aspect of the present invention, there is provided a liquid crystal display device having the polarizing plate on at least one surface of a liquid crystal cell.

Advantageous Effects

The adhesive composition of the present invention comprises a tertiary amine group-containing acrylic copolymer and a sulfonate group-containing acrylic copolymer wherein an ionic functional group can be introduced by cross-linking reaction thereof, thereby exhibiting good antistatic properties and excellent durability.

BEST MODE

The present invention is, hereinafter, described in more detail.

One embodiment of the present invention relates to an adhesive composition comprising a tertiary amine group-containing acrylic copolymer and a sulfonate group-containing acrylic copolymer.

In one embodiment of present invention, the tertiary amine group-containing acrylic copolymer may be obtained by copolymerization of a (meth)acrylate monomer and a monomer simultaneously containing an unsaturated double bond and a tertiary amine group within the molecule.

In one embodiment of present invention, the monomer simultaneously containing an unsaturated double bond and a tertiary amine group within the molecule may be a (meth)acrylate containing a tertiary amine group. Specific examples of the monomer may be at least one selected from compounds of formulas (1) to (8).

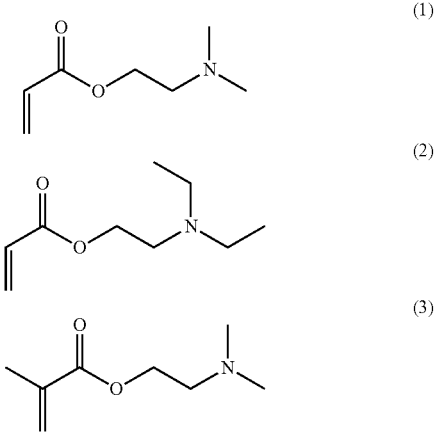

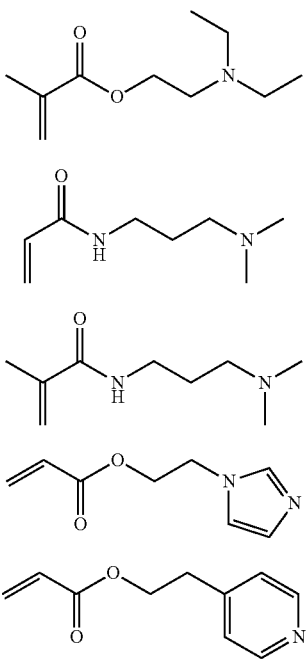

(4)

(5)

(6)

(7)

(8)

The monomer that simultaneously contains an unsaturated double bond and a tertiary amine group within the molecule is preferably present in an amount of 1 to 20 wt %, more preferably 2 to 10 wt %, based on 100 wt % of the tertiary amine group-containing acrylic copolymer. If the amount of the monomer is less than 1 wt %, the durability may be poor due to weak cohesive strength resulted from insufficient cross-linking. If the amount of the monomer is more than 20 wt %, the peeling force of a release film may increase due to residual amine groups, making the release film difficult to be peeled. Also, the use of an additional cross-linking agent may increase the viscosity of a coating solution.

In one embodiment of the present invention, the (meth) acrylate monomer may have a $C_{1-12}$ alkyl group. Specific examples of the (meth)acrylate monomer may include n-butyl (meth)acrylate, 2-butyl (meth)acrylate, t-butyl (meth)acrylate, 2-ethylhexyl (meth)acrylate, 2-ethylbutyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, n-nonyl (meth)acrylate, isononyl (meth)acrylate, decyl (meth)acrylate, lauryl (meth)acrylate, etc. These monomers may be used alone or in combination of two or more. Among them, n-butyl acrylate, 2-ethylhexyl acrylate, and a mixture thereof are preferred.

The (meth)acrylate monomer is preferably present in an amount of 80 to 99 wt %, more preferably 90 to 95 wt %, based on 100 wt % of the total monomers used in the preparation of the acrylic copolymer. If the amount of the (meth)acrylate monomer is less than 80 wt %, the adhesive strength may be insufficient. If the amount of the (meth) acrylate monomer is more than 99 wt %, the cohesive strength may be lowered.

In one embodiment of present invention, the tertiary amine group-containing acrylic copolymer may be a copolymer of a (meth)acrylate monomer, a monomer simultaneously containing an unsaturated double bond, and a tertiary amine group within the molecule, and a monomer having a cross-linkable functional group.

The monomer having a cross-linkable functional group is used to give cohesive strength or adhesive strength through chemical bonding with a cross-linking agent as described below, and may include a monomer having a hydroxyl group, a monomer having a carboxyl group, a monomer having an amide group, etc. These monomers may be used alone or in combination of two or more.

Examples of the monomer having a hydroxyl group may include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethyleneglycol (meth)acrylate, 2-hydroxypropyleneglycol (meth)acrylate, hydroxyalkyleneglycol (meth) acrylate having a $C_{2-4}$ alkylene group, etc. Among them, 2-hydroxyethyl (meth)acrylate is preferred.

Examples of the monomer having a carboxyl group may include monobasic acids such as (meth)acrylic acid and crotonic acid; dibasic acids such as maleic acid, itaconic acid and fumaric acid, and monoalkylesters thereof; 3-(meth) acryloylpropionic acid; succinic anhydride ring-opening adducts of 2-hydroxyalkyl (meth)acrylate having a $C_{2-3}$ alkyl group, succinic anhydride ring-opening adducts of hydroxyalkyleneglycol (meth)acrylate having a $C_{2-4}$ alkylene group, compounds obtained by ring-opening addition of succinic anhydride to carprolactone adduct of 2-hydroxyalkyl (meth)acrylate having a $C_{2-3}$ alkyl group, etc. Among them, (meth)acrylic acid is preferred.

Examples of the monomer having an amide group may include (meth)acrylamide, N-isopropylacrylamide, N-tert-butylacrylamide, etc. Among them, (meth)acrylamide is preferred.

The monomer having a cross-linkable functional group is preferably present in an amount of 1 to 20 wt %, more preferably 1 to 10 wt %, based on 100 wt % of the total monomers used in the preparation of the acrylic copolymer. If the amount of the monomer having a cross-linkable functional group is less than 1 wt %, the cohesive strength may be lowered. If the amount of the monomer having a cross-linkable functional group is more than 20 wt %, the adhesive strength may be deteriorated.

In addition to the above monomers, other monomers may be further contained in a range not to degrade the adhesive strength, for example 10 wt % or less, preferably 5 wt % or less.

In one embodiment of present invention, the sulfonate group-containing acrylic copolymer may be obtained by copolymerization of a (meth)acrylate monomer and a monomer simultaneously containing an unsaturated double bond and a sulfonate group within the molecule.

In one embodiment of present invention, the monomer simultaneously containing an unsaturated double bond and a sulfonate group within the molecule may be a (meth)acrylate containing a sulfonate group. Specific examples thereof may be at least one selected from compounds of formulas (9) to (12).

(9)

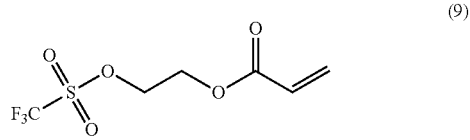

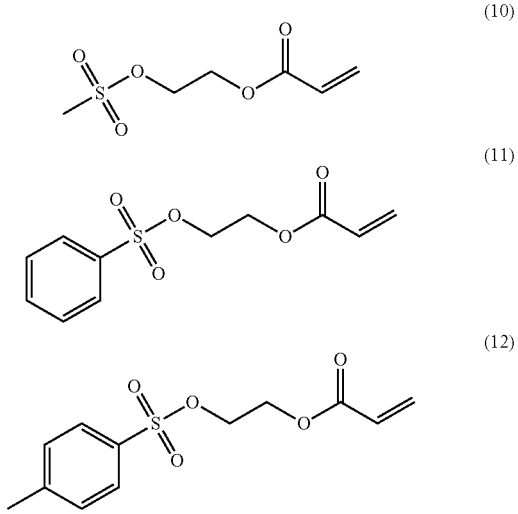

(10)
(11)
(12)

The monomer that simultaneously contains an unsaturated double bond and a sulfonate group within the molecule is preferably present in an amount of 1 to 20 wt %, more preferably 2 to 10 wt %, based on 100 wt % of the sulfonate group-containing acrylic copolymer. If the amount of the monomer is less than 1 wt %, the durability may be poor due to weak cohesive strength resulted from insufficient cross-linking. If the amount of the monomer is more than 20 wt %, the stability over time of the coating solution may be insufficient owing to the presence of the residual sulfonate groups.

In one embodiment of present invention, the (meth)acrylate monomer may be the same as those used in the preparation of the tertiary amine group-containing acrylic copolymer.

In one embodiment of present invention, the sulfonate group-containing acrylic copolymer may be a copolymer of a (meth)acrylate monomer, a monomer simultaneously containing an unsaturated double bond and a sulfonate group within the molecule, and a monomer having a cross-linkable functional group.

The monomer having a cross-linkable functional group may be the same as those used in the preparation of the tertiary amine group-containing acrylic copolymer.

Also, polymeric monomers other than the above-mentioned monomers may be used within the range not to deteriorate adhesiveness, for example in an amount of 10 wt % or less, preferably 5 wt % or less, like the case of the tertiary amine group-containing acrylic copolymer.

The tertiary amine group-containing acrylic copolymer and the sulfonate group-containing acrylic copolymer may be each obtained according to conventional methods known in the art, for example bulk polymerization, solution polymerization, emulsion polymerization or suspension polymerization, etc., but not limited thereto. Among them, the solution polymerization is preferred. Further, a solvent, a polymerization initiator, a chain transfer agent for controlling the molecular weight, etc. which are conventionally known in the art can be used for the polymerization.

Each of the tertiary amine group-containing acrylic copolymer and the sulfonate group-containing acrylic copolymer may have a polystyrene-converted weight average molecular weight of 50,000 to 2,000,000, preferably 1,000,000 to 2,000,000, as measured by gel permeation chromatography (GPC).

In the adhesive composition of the present invention, the tertiary amine group-containing acrylic copolymer and the sulfonate group-containing acrylic copolymer are subject to cross-linking reaction to introduce an ionic functional group while curing is conducted after the formation of an adhesive layer, as shown in the following Reaction Scheme 1.

[Reaction Scheme 1]

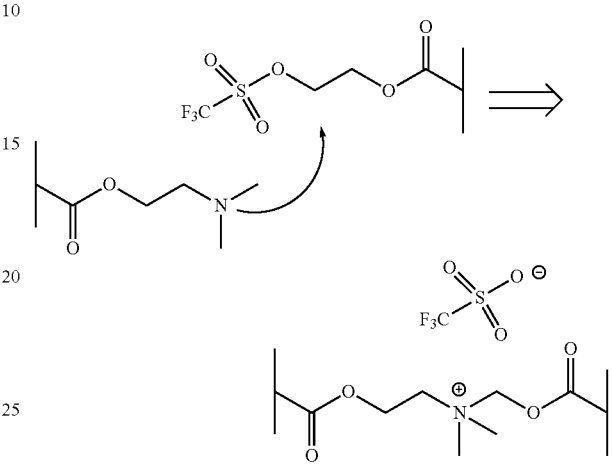

Thus, cross-linkage is formed between the tertiary amine group-containing acrylic copolymer and the sulfonate group-containing acrylic copolymer, and an ionic functional group (ammonium salt) is introduced, whereby an adhesive layer formed from the adhesive composition has good durability and antistatic properties.

It is preferred that the curing for facilitating the cross-linking reaction is conducted under warm conditions. Specifically, the curing temperature is preferably 50 to 70° C., more preferably 55 to 65° C. If the curing temperature is lower than 50° C., the cross-linkage between two polymers is insufficient, making it difficult to obtain good durability. If the curing temperature is higher than 70° C., adhesiveness may be deteriorated or remaining stress is difficult to be lowed owing to excessive cross-linking reaction.

The adhesive composition according to one embodiment of the present invention may further comprise a cross-linking agent and a silane coupling agent.

In one embodiment of the present invention, the cross-linking agent is used to enhance the cohesive strength of the adhesive by cross-linking the copolymer. By way of examples, the cross-linking agent may include, without limitation, isocyanate compounds, epoxy compounds, etc. These compounds may be used alone or in combination of two or more.

Examples of the isocyanate compounds may include diisocyanate compounds such as tolylene diisocyanate, xylene diisocyanate, 2,4-diphenylmethane diisocyanate, 4,4-diphenylmethane diisocyanate, hexamethylene diisocyanate, isophorone diisocyanate, tetramethylxylene diisocyanate, and naphthalene diisocyanate; and multifunctional isocyanate compounds having three functional groups such as adducts obtained by reacting 1 mol of polyhydric alcohol compounds such as trimethylolpropane with 3 mol of diisocyanate compounds, isocyanurates obtained by self-condensation of 3 mol of diisocyanate compounds, biurets obtained by condensation of diisocyanate ureas prepared from 2 mol of diisocyanate compounds with 1 mol of diisocyanate compound, triphenylmethane triisocyanate, and methylenebistriisocyanate.

Examples of the epoxy compounds may include ethyleneglycol diglycidyl ether, diethyleneglycol diglycidyl ether, polyethyleneglycol diglycidyl ether, propyleneglycol diglycidyl ether, tripropyleneglycol diglycidyl ether, polypropyleneglycol diglycidyl ether, neopentylglycol diglycidyl ether, 1,6-hexanediol diglycidyl ether, polytetramethyleneglycol diglycidyl ether, glycerol diglycidyl ether, glycerol triglycidyl ether, diglycerol polyglycidyl ether, polyglycerol polyglycidyl ether, resorcin diglycidyl ether, 2,2-dibromoneopentylglycol diglycidyl ether, trimethylolpropane triglycidyl ether, pentaerythritol polyglycidyl ether, sorbitol polyglycidyl ether, adipic acid diglycidyl ester, phthalic acid diglycidyl ester, tris(glycidyl)isocyanurate, tris (glycidoxyethyl)isocyanurate, 1,3-bis(N,N-glycidylaminomethyl)cyclohexane, N,N,N',N'-tetraglycidyl-m-xylylenediamine, etc.

In addition to the isocyanate compounds and epoxy compounds, melamine compounds may be further used alone or in combination of two or more.

Examples of the melamine compounds may include hexamethylolmelamine, hexamethoxymethylmelamine, hexabutoxymethylmelamine, etc.

The cross-linking agent may be preferably contained in an amount of 0.1 to 15 parts by weight, more preferably 0.1 to 5 parts by weight, based on 100 parts by weight of the acrylic copolymers. If the amount of the cross-linking agent is less than 0.1 parts by weight, the cohesive strength may be decreased due to insufficient cross-linking, thereby resulting in durability deterioration such as lifting and damaging cutting property. If the amount of the cross-linking agent is more than 15 parts by weight, the residual stress cannot be sufficiently relaxed due to excessive cross-linking.

In one embodiment of the present invention, silane coupling agent may include, without limitation, vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, etc. These compounds may be used alone or in combination of two or more.

The silane coupling agent is preferably present in an amount of 0.01 to 5 parts by weight, more preferably 0.05 to 2.5 parts by weight, based on 100 parts by weight of the acrylic copolymers. If the amount of the silane coupling agent is less than 0.01 parts by weight, the adhesion to a substrate under high heat and moisture condition can be lowered. If the amount of the silane coupling agent is more than 5 parts by weight, bubbles or peeling can occur, thereby deteriorating durability.

The adhesive composition according to one embodiment of the present invention may further comprise an antistatic agent.

The examples of the antistatic agent may include, without limitation, 1-hexyl-4-methylpyridinium hexafluorophosphate, dodecylpyridinium hexafluorophosphate, fluorinated organic metal compounds (e.g., HQ-115, 3M), alkali metal salts (e.g., $NaPF_6$, $NaSbF_6$, $KPF_6$, $KSbF_6$), conductive polymers (e.g., polythiophene (PEDOT, Bayer), polyaniline, polypyrrole), metal oxides (e.g., indium-doped tin oxide (ITO), antimony-doped tin oxide (ATO), tin oxide, zinc oxide, antimony oxide, indium oxide), quaternary ammonium salts (e.g., solution of poly(acrylamide-co-diallyldimethylammonium chloride), Sigma-Aldrich), 1-butyl-3-methylimidazolium hexafluorophosphate ([BMIM][$PF_6$]), 1-butyl-3-(2-hydroxyethyl)imidazolium bis(trifluoromethanesulfonyl)imide ([BHEIM][$NTf_2$]), tetrabutylmethylammonium bis(trifluoromethanesulfonyl)imide ([TBMA][$NTf_2$]), etc. These antistatic agents may be used alone or in combination of two or more. Among these, 1-hexyl-4-methylpyridinium hexafluorophosphate, HQ-115, $NaPF_6$, 1-butyl-3-(2-hydroxyethyl)imidazolium bis(trifluoromethanesulfonyl)imide are preferred in terms of transparency and fouling resistance.

The antistatic agent is preferably present in an amount of 0 to 5 parts by weight, more preferably 0.05 to 3 parts by weight, based on 100 parts by weight of the acrylic copolymers. If the amount of the antistatic agent is higher than 5 parts by weight, transparency may be deteriorated.

The adhesive composition according to one embodiment of the present invention, if necessary, may further comprise an additive such as an adhesion enhancing resin, an anti-oxidant, an anti-corrosive agent, a leveling agent, a surface lubricant, a dye, a pigment, a defoaming agent, a filler, and a light stabilizer in order to control adhesion, cohesion, viscosity, elasticity, glass transition temperature, etc.

The adhesive composition of the present invention may be used for an adhesive for attaching a polarizing plate with a liquid crystal cell and an adhesive for a surface protective film. Also, the adhesive composition may be used for an adhesive for a protective film, a reflective sheet, an adhesive sheet for structures, an adhesive sheet for photographs, an adhesive sheet for traffic lanes, optical adhesive products, electronic parts, general adhesive sheet products, and medical patches.

One embodiment of the present invention relates to a polarizing plate including an adhesive layer comprising the adhesive composition as described above.

The thickness of the adhesive layer may vary depending on its adhesive strength, and may preferably range from 3 to 100 μm, more preferably 10 to 100 μm.

Such a polarizing plate may be applied to typical liquid crystal display devices. Particularly, the polarizing plate may be used to fabricate a liquid crystal display device including a liquid crystal panel wherein the polarizing plate having the adhesive layer is laminated on at least one side of a liquid crystal cell.

Therefore, one embodiment of the present invention relates to a liquid crystal display device having the polarizing plate on at least one side of a liquid crystal cell.

The present invention is further illustrated by the following examples, comparative examples and experimental examples, which are not to be construed to limit the scope of the invention.

PREPARATION EXAMPLE 1

Preparation of Tertiary Amine Group-Containing Acrylic Copolymer

PREPARATION EXAMPLE 1-1

To a 1 L reactor equipped with a cooler and subjected to nitrogen gas flow were added a monomer mixture consisting of 95 parts by weight of n-butyl acrylate (BA), 2 parts by weight of 2-hydroxyethyl acrylate (HEA), and 3 parts by weight of dimethylaminoethyl acrylate (compound of formula (1)), and then 100 parts by weight of ethyl acetate (EAc) as a solvent. Then, nitrogen gas was purged for 1 hour to remove oxygen, followed by maintaining the temperature to 62° C. After uniformly stirring the mixture, 0.07 parts by weight of azobisisobutyronitrile (AIBN) as a reaction initiator was added thereto, and the resulting mixture was reacted for 6 hours to give a tertiary amine group-containing acrylic copolymer (weight average molecular weight: about 1,000,000).

PREPARATION EXAMPLE 1-2

The procedures of Preparation Example 1-1 were repeated except that the compound of formula (3) was used instead of dimethylaminoethyl acrylate (compound of formula (1)) to give a tertiary amine group-containing acrylic copolymer.

PREPARATION EXAMPLE 1-3

The procedures of Preparation Example 1-1 were repeated except that the compound of formula (5) was used instead of dimethylaminoethyl acrylate (compound of formula (1)) to give a tertiary amine group-containing acrylic copolymer.

PREPARATION EXAMPLE 1-4

The procedures of Preparation Example 1-1 were repeated except that the compound of formula (7) was used instead of dimethylaminoethyl acrylate (compound of formula (1)) to give a tertiary amine group-containing acrylic copolymer.

PREPARATION EXAMPLE 1-5

The procedures of Preparation Example 1-1 were repeated except that the compound of formula (8) was used instead of dimethylaminoethyl acrylate (compound of formula (1)) to give a tertiary amine group-containing acrylic copolymer.

PREPARATION EXAMPLE 2

Preparation of Sulfonate Group-Containing Acrylic Copolymer

PREPARATION EXAMPLE 2-1

To a 1 L reactor equipped with a cooler and subjected to nitrogen gas flow were added a monomer mixture consisting of 95 parts by weight of n-butyl acrylate (BA), 2 parts by weight of 2-hydroxyethyl acrylate (HEA), and 3 parts by weight of 2-trifluoromethylsulfonyl ethyl acrylate (compound of formula (9)), and then 100 parts by weight of ethyl acetate (EAc) as a solvent. Then, nitrogen gas was purged for 1 hour to remove oxygen, followed by maintaining the temperature to 62° C. After uniformly stirring the mixture, 0.07 parts by weight of azobisisobutyronitrile (AIBN) as a reaction initiator was added thereto, and the resulting mixture was reacted for 6 hours to give a sulfonate group-containing acrylic copolymer (weight average molecular weight: about 1,000,000).

PREPARATION EXAMPLE 2-2

The procedures of Preparation Example 2-1 were repeated except that the compound of formula (10) was used instead of 2-trifluoromethylsulfonyl ethyl acrylate (compound of formula (9)) to give a sulfonate group-containing acrylic copolymer.

PREPARATION EXAMPLE 2-3

The procedures of Preparation Example 2-1 were repeated except that the compound of formula (12) was used instead of 2-trifluoromethylsulfonyl ethyl acrylate (compound of formula (9)) to give a sulfonate group-containing acrylic copolymer.

EXAMPLES 1 TO 10 AND COMPARATIVE EXAMPLES 1 to 3

Preparation of Adhesive-Attached Polarizing Plate

Components listed in Table 1 were mixed in parts by weight, and each mixture was diluted with ethyl acetate to give an adhesive composition having a solid concentration of 15%.

Each adhesive composition thus obtained was applied on a silicon releasing agent-coated film in a thickness of 25 μm, and dried at 100° C. for 1 minute to form an adhesive layer.

Triacetyl cellulose films were attached to both surfaces of an iodine polarizer with a thickness of 30 μm to give polarizing plate A, and a triacetyl cellulose film was attached to one surface of another iodine polarizer having the same thickness to give polarizing plate B. Then, the adhesive layer formed above was attached to one surface of polarizing plate A, and the adhesive layer formed above was attached to the polarizer side of polarizing plate B, followed by curing at 60° C. for 6 days, to prepare adhesive-attached polarizing plates A and B.

TABLE 1

|  | Copolymer 1 | Copolymer 2 | Cross-linking Agent | Silane Coupling Agent | Antistatic Agent |
|---|---|---|---|---|---|
| Example 1 | Preparation Example 1-1: 50 | Preparation Example 2-1: 50 | 0.5 | 0.5 | — |
| Example 2 | Preparation Example 1-1: 50 | Preparation Example 2-1: 50 | 0.5 | 0.5 | 0.5 |
| Example 3 | Preparation Example 1-2: 50 | Preparation Example 2-1: 50 | 0.5 | 0.5 | — |

TABLE 1-continued

|  | Copolymer 1 | Copolymer 2 | Cross-linking Agent | Silane Coupling Agent | Antistatic Agent |
|---|---|---|---|---|---|
| Example 4 | Preparation Example 1-3: 50 | Preparation Example 2-1: 50 | 0.5 | 0.5 | — |
| Example 5 | Preparation Example 1-4: 50 | Preparation Example 2-1: 50 | 0.5 | 0.5 | — |
| Example 6 | Preparation Example 1-5: 50 | Preparation Example 2-1: 50 | 0.5 | 0.5 | — |
| Example 7 | Preparation Example 1-1: 50 | Preparation Example 2-2: 50 | 0.5 | 0.5 | — |
| Example 8 | Preparation Example 1-1: 50 | Preparation Example 2-3: 50 | 0.5 | 0.5 | — |
| Example 9 | Preparation Example 1-2: 50 | Preparation Example 2-1: 50 | 0.5 | 0.5 | 0.5 |
| Example 10 | Preparation Example 1-3: 50 | Preparation Example 2-1: 50 | 0.5 | 0.5 | 0.5 |
| Example 11 | Preparation Example 1-1: 50 | Preparation Example 2-1: 50 | — | 0.5 | — |
| Com. Example 1 | Preparation Example 1-1: 100 | — | 0.5 | 0.5 | — |
| Com. Example 2 | Preparation Example 1-1: 100 | — | 0.5 | 0.5 | 0.5 |
| Com. Example 3 | — | Preparation Example 2-1: 100 | 0.5 | 0.5 | — |

Cross-linking Agent: Coronate-L (Adduct of Tolylene diisocyanate-Trimethylolpropane, Nippon Polyurethane Industry)
Silane Coupling Agent: KBM-403 (3-glycidoxypropyltrimethoxysilane, Shin-Etsu)
Antistatic Agent: 1-hexyl-4-methylpyridinium hexafluorophosphate (Uniplus)

EXPERIMENTAL EXAMPLE 1

Evaluation of Heat-Resistant Durability, Anti-Static Property and Optical Property Under Heat/Moisture-Resistant Conditions The adhesive-attached polarizing plates prepared in the Examples and Comparative Examples were measured for their physical properties using the following methods, and the results were shown in Table 2.

(1) Heat-Resistant Durability

After removing the release film of adhesive-attached polarizing plate A, the adhesive layer thereof was attached to a glass (Corning Inc.) and was treated in an autoclave and then left at 80 ° for 300 hours, followed by observing the occurrence of bubbles and peelings.

<Evaluation Criteria>

◎: no bubble or peeling

○: little or very small bubbles or peelings

Δ: some bubbles or peelings x: many bubbles over considerable areas or peelings of a 1 cm or more size (2) Anti-Static Property After removing the release film of adhesive-attached polarizing plate A, the adhesive layer thereof was measured for its surface electrical resistivity at 3 positions thereof using MCP-HT450 (Mitsubishi Chemical). The measurement was repeated 10 times, and the results thereof were represented by an average value (Ω/□).

<Evaluation Criteria>

◎: surface electrical resistivity less than $1 \times 10^{11}$

○: surface electrical resistivity not less than $1 \times 10^{11}$ and less than $5 \times 10^{11}$ Δ: surface electrical resistivity not less than $5 \times 10^{11}$ and less than $1 \times 10^{12}$ x: surface electrical resistivity not less than $1 \times 10^{12}$ (3) Optical Property Under Heat and Moisture-Resistant Conditions After removing the release film of adhesive-attached polarizing plate B, the adhesive layer thereof was attached to a glass (Corning Inc.) and was treated in an autoclave and then left at 60° C. and 90 RH % for 300 hours, followed by observing the polarity thereof.

<Evaluation Criteria>

◎: polarity higher than 95%

○: polarity of 90 to 95% x: polarity less than 90%

TABLE 2

|  | Heat-Resistant Durability | Antistatic Property | Optical Property Under Heat/Moisture-Resistant conditions |
|---|---|---|---|
| Example 1 | ◎ | ○ | ◎ |
| Example 2 | ◎ | ◎ | ○ |
| Example 3 | ◎ | ○ | ◎ |
| Example 4 | ◎ | ○ | ◎ |
| Example 5 | ◎ | ○ | ◎ |
| Example 6 | ◎ | ○ | ◎ |
| Example 7 | ◎ | ○ | ◎ |
| Example 8 | ◎ | ○ | ◎ |
| Example 9 | ◎ | ◎ | ○ |
| Example 10 | ◎ | ◎ | ○ |
| Example 11 | ○ | ○ | ◎ |
| Com. Example 1 | Δ | X | ◎ |
| Com. Example 2 | Δ | ○ | X |
| Com. Example 3 | Δ | X | ◎ |

As shown in Table 2, the polarizing plates of Examples 1 to 11, obtained from an adhesive composition comprising a tertiary amine group-containing acrylic copolymer and a sulfonate group-containing acrylic copolymer, exhibited significantly good results in terms of heat-resistant durability, anti-static property and optical property under heat/moisture-resistant conditions, as compared with those of Comparative Examples 1 to 3 from an adhesive composition comprising only a tertiary amine group-containing acrylic copolymer or only a sulfonate group-containing acrylic copolymer.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

The invention claimed is:

1. An adhesive composition comprising a tertiary amine group-containing acrylic copolymer and a sulfonate group-containing acrylic copolymer,
wherein the sulfonate group-containing acrylic copolymer is obtained by copolymerization of a (meth)acrylate monomer and a monomer molecule simultaneously containing an unsaturated double bond and a sulfonate group within the monomer molecule, and
the monomer molecule simultaneously containing an unsaturated double bond and a sulfonate group within the monomer molecule comprises at least one selected from the group consisting of formulas (9) to (12):

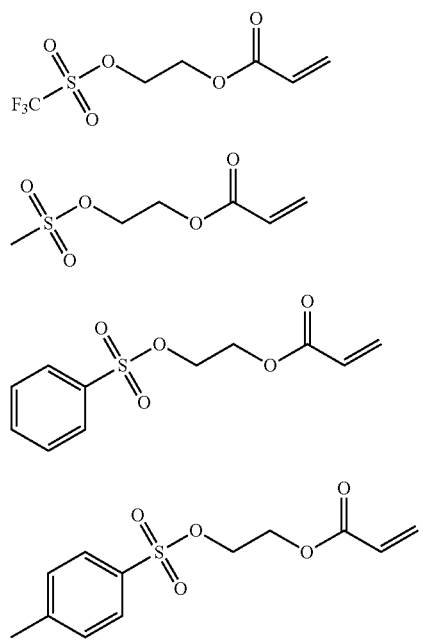

2. The adhesive composition of claim 1, wherein the tertiary amine group-containing acrylic copolymer is obtained by copolymerization of a (meth)acrylate monomer and a monomer molecule simultaneously containing an unsaturated double bond and a tertiary amine group within the monomer molecule.

3. The adhesive composition of claim 2, wherein the monomer molecule simultaneously containing an unsaturated double bond and a tertiary amine group within the monomer molecule is a (meth)acrylate containing a tertiary amine group.

4. The adhesive composition of claim 2, wherein the monomer molecule simultaneously containing an unsaturated double bond and a tertiary amine group within the monomer molecule is present in an amount of 1 to 20 wt % based on 100 wt % of the tertiary amine group-containing acrylic copolymer.

5. The adhesive composition of claim 2, wherein the monomer molecule simultaneously containing an unsaturated double bond and a tertiary amine group within the monomer molecule comprises at least one selected from the group consisting of formulas (1) to (8):

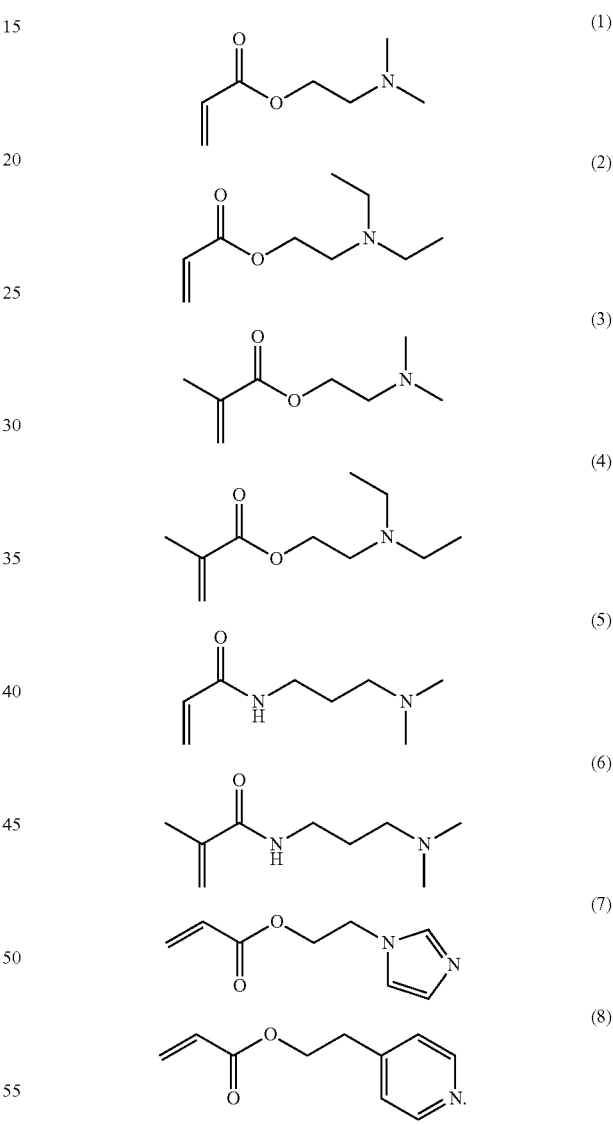

6. The adhesive composition of claim 1, wherein the monomer molecule simultaneously containing an unsaturated double bond and a sulfonate group within the monomer molecule is present in an amount of 1 to 20 wt % based on 100 wt % of the sulfonate group-containing acrylic copolymer.

7. The adhesive composition of claim 1, wherein the tertiary amine group-containing acrylic copolymer and the sulfonate group-containing acrylic copolymer are subject to cross-linking reaction to introduce an ionic functional group while curing is conducted after the formation of an adhesive layer.

8. The adhesive composition of claim 7, wherein the curing is conducted at 50 to 70° C.

9. The adhesive composition of claim 1, which further comprises a cross-linking agent and a silane coupling agent.

10. The adhesive composition of claim 1, which further comprises an antistatic agent.

11. A polarizing plate including an adhesive layer comprising the adhesive composition of claim 1.

12. A liquid crystal display device having the polarizing plate of claim 11 on at least one side of a liquid crystal cell.

* * * * *